(12) United States Patent
Pilard et al.

(10) Patent No.: US 8,599,676 B2
(45) Date of Patent: Dec. 3, 2013

(54) OPTICAL DISC WITH IMPROVED SENSITIVITY FOR SUPER-RESOLUTION PITS AND LANDS

(75) Inventors: Gael Pilard, Marly (FR); Larisa Von Riewel, Mainaschaff (DE)

(73) Assignee: Thomson Licensing (FR)

( * ) Notice: Subject to any disclaimer, the term of this patent is extended or adjusted under 35 U.S.C. 154(b) by 240 days.

(21) Appl. No.: 13/068,214

(22) Filed: May 5, 2011

(65) Prior Publication Data

US 2011/0276991 A1 Nov. 10, 2011

(30) Foreign Application Priority Data

May 7, 2010 (EP) .................................... 10305482

(51) Int. Cl.
*G11B 7/24* (2013.01)

(52) U.S. Cl.
USPC ..................... 369/275.4; 369/275.1

(58) Field of Classification Search
USPC .................. 369/275.4, 275.3, 275.2, 275.1;
428/64.1, 64.2, 64.4; 430/321, 320,
430/270.11, 270.13; 720/718
See application file for complete search history.

(56) References Cited

U.S. PATENT DOCUMENTS

| | | | |
|---|---|---|---|
| 2011/0002218 A1* | 1/2011 | Fery et al. ................... | 369/275.4 |
| 2011/0038248 A1* | 2/2011 | Fery et al. ................... | 369/275.4 |
| 2011/0261665 A1* | 10/2011 | Pilard ........................ | 369/47.44 |
| 2013/0058203 A1* | 3/2013 | Pilard et al. ................ | 369/275.4 |
| 2013/0064056 A1* | 3/2013 | Pilard et al. ................ | 369/30.27 |

FOREIGN PATENT DOCUMENTS

| | | |
|---|---|---|
| EP | 0814464 | 12/1997 |
| WO | WO2009101072 | 8/2009 |
| WO | WO2009109614 | 9/2009 |
| WO | WO2009109653 | 9/2009 |

OTHER PUBLICATIONS

Kim et al., "Random Signal Characteristics of Super Resolution Near Field Structure Read-Only Memory Disc", Japanese Journal of Applied Physics. vol. 45, No. 2B, 2006, pp. 1374-1378.
Kurihara et al., "High-Speed Fabrication of Super-Resolution Near-Field Structure Read-Only Memory Master Disc using PtOx Thermal Decomposition Lithography", Japanese Journal of Applied Physics, ol. 45, No. 2B, 2006, pp. 1379-1382.
Yoon et al., "Super Resolution Read Only Memory Disc Using Super-Resolution Near-Field Structure Technology", Japanese Journal of Applied Physics, vol. 43, No. 7B, 2004, pp. 4945-4948.
EP Search Report dated Sep. 8, 2010.

* cited by examiner

*Primary Examiner* — Tan X Dinh
(74) *Attorney, Agent, or Firm* — Jack Schwartz and Associates, PLLC

(57) ABSTRACT

The optical disc comprises a substrate layer, a read-only data layer having a pit/land data structure with an average pit width, arranged in tracks on the substrate layer, and a nonlinear layer with a super-resolution structure disposed on the data layer, wherein a super-resolution pit following a super-resolution land and a preceding diffractive pit is enlarged in width with regard to the average pit width, and a diffractive pit preceding a super-resolution land and a subsequent super-resolution pit is reduced in pit width with regard to the average pit width.

11 Claims, 7 Drawing Sheets

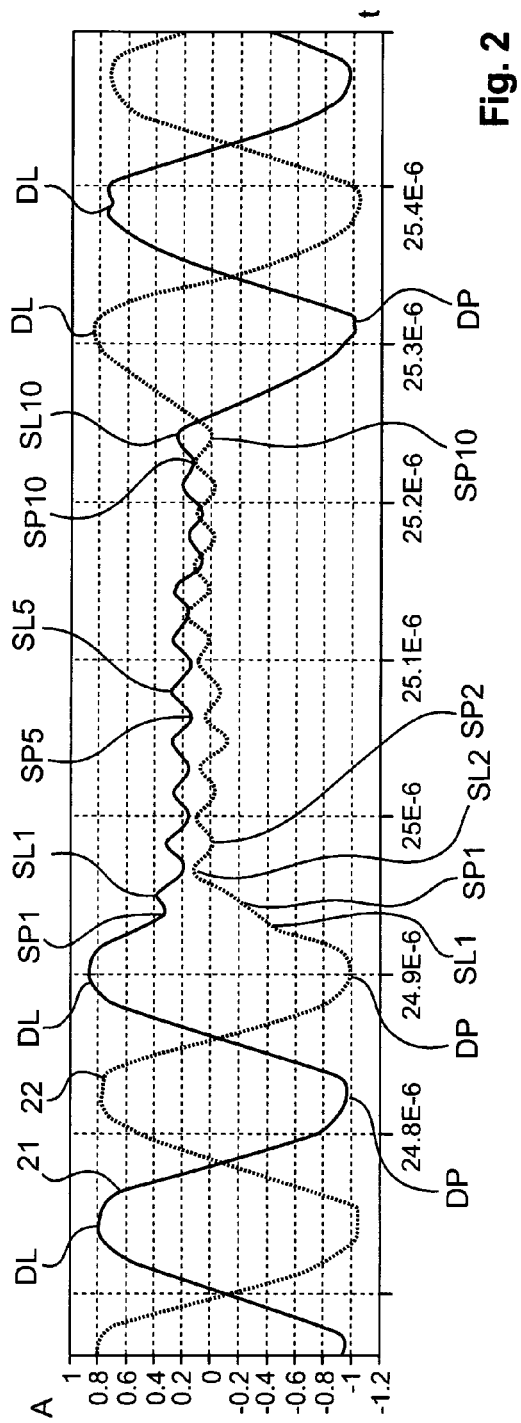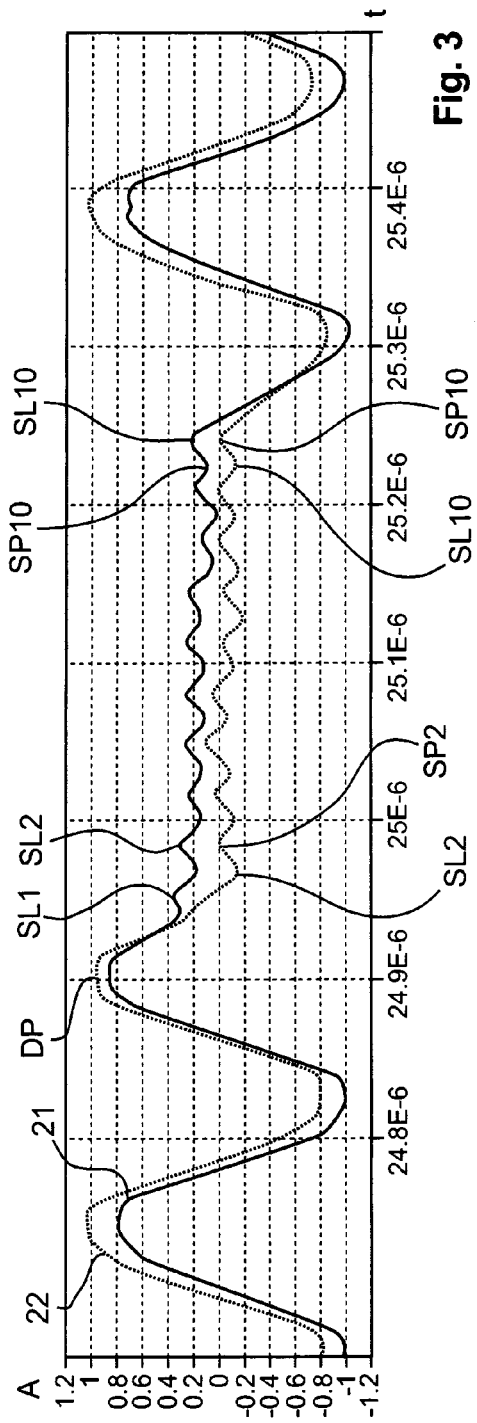

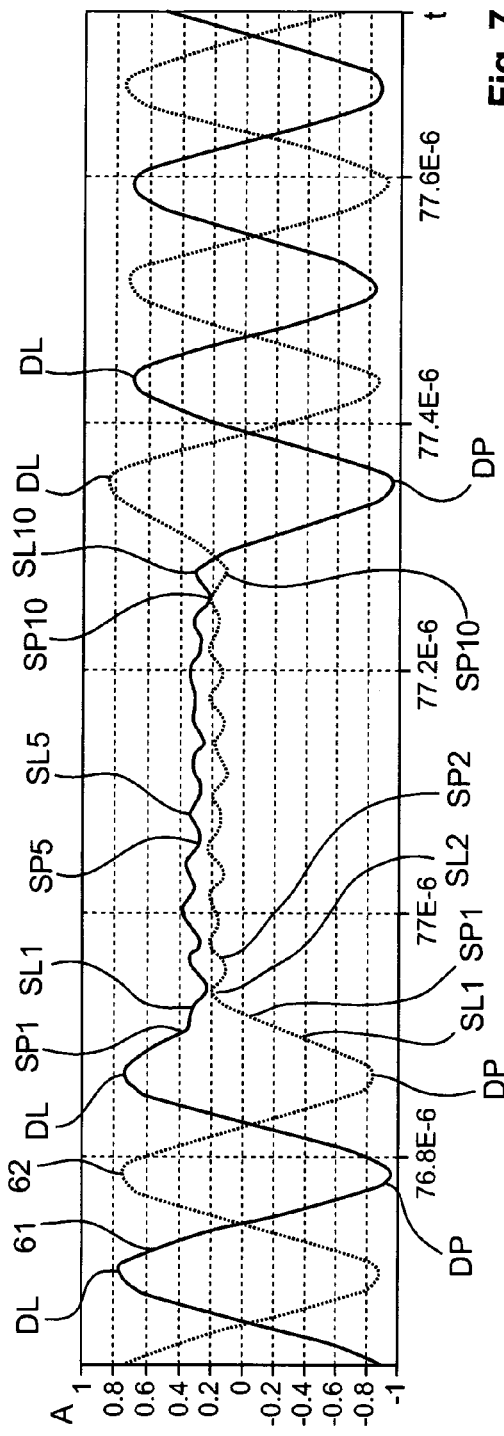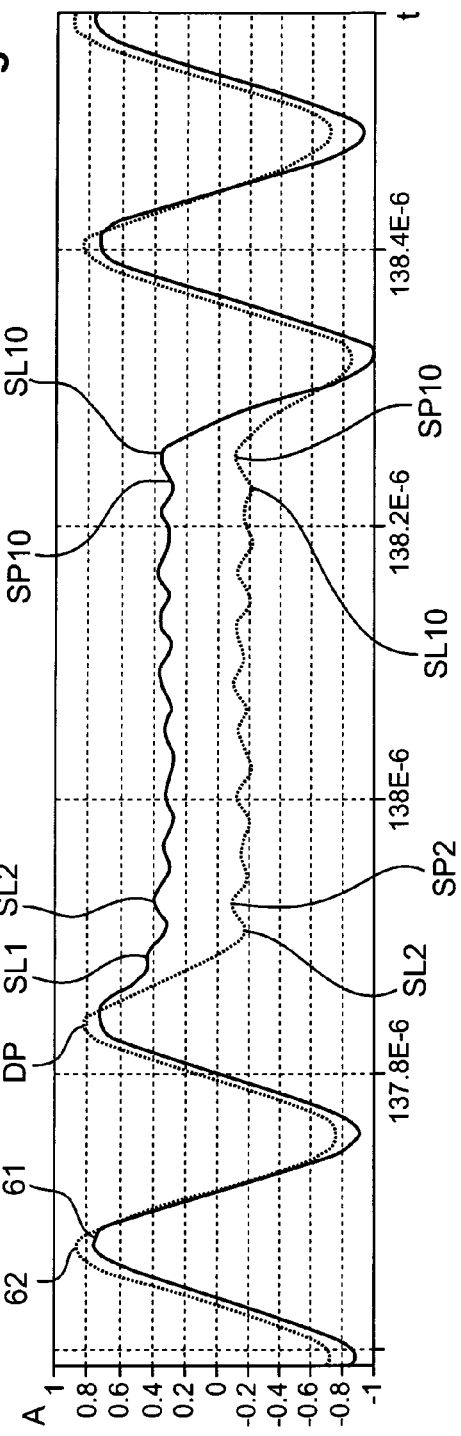

OPTICAL DISC WITH IMPROVED SENSITIVITY FOR SUPER-RESOLUTION PITS AND LANDS

This application claims the benefit, under 35 U.S.C. §119 of EP Patent Application 10305482.1, filed 07 May 2010.

TECHNICAL FIELD OF THE INVENTION

The present invention relates to an optical storage medium comprising a substrate layer, a data layer and a nonlinear layer with a super-resolution structure arranged above the data layer. The data layer comprises in particular pits and lands having a size above an optical resolution limit and pits and lands having a size below the optical resolution limit of a pickup for reading of the data being arranged on the data layer.

BACKGROUND OF THE INVENTION

Optical storage media are media in which data are stored in an optically readable manner, for example by means of a laser and an optical detector, for example a photo detector, being integrated within a pickup. The detector is used for detecting reflected light of the laser beam when reading data on the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to about 50 GB on a dual layer disc. For reading and writing of a Blu-Ray disc an optical pickup with a laser wavelength of 405 nm and a numerical aperture of 0.85 is used. On the Blu-Ray disc a track pitch of 320 nm and a mark length from 2T to 8T or 9T is used, where T is the channel bit length and wherein 2T corresponds with a minimum mark length of 138, 149 or 160 nm.

The diffraction limit of optical instruments as described by the Abbe theory is about lambda/2NA, which is 238 nm for a Blu-Ray type pickup with a wavelength lambda=405 nm and a numerical aperture NA=0.85. This theoretical minimal detectable length from the diffraction theory is corresponding to a period of the pattern function, which is formed of a pit and of a land having the same length. The smallest detectable element of such a system is a pit or a land having a length of about lambda/4NA, which corresponds for a Blu-Ray type pickup with a length of 120 nm.

New optical storage media with a super-resolution structure offer the possibility to increase the data density of the optical storage medium by a factor of two to four in one dimension as compared with the Blu-Ray disc. This is possible by including a nonlinear layer, which is placed above a data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, and which center reflectivity is dependent on the pit structure of the corresponding data layer. Therefore, the super-resolution effect allows to record and read data stored in marks of an optical disc, which have a size below the optical resolution limit of lambda/4NA of a corresponding optical pickup.

The nonlinear layer is often called a super-resolution near-field structure (Super-RENS) layer because it is assumed that for some specific materials, the optical effect of reducing the effective spot size of the laser beam is based on a near-field interaction between the marks and spaces of the data layer and the nonlinear layer. Super-RENS optical discs comprising a super-resolution near-field structure formed of a metal oxide, a polymer compound or a phase-change layer comprising GeSbTe or AgInSbTe are known.

In EP-A-1215665, an optical storage medium is disclosed comprising a read-only data layer having a non-inverse pit/land data structure with concave pits corresponding with holes and an optical storage medium comprising a read-only data layer having an inverse pit/land data structure with convex pits corresponding with bumps on a substrate layer.

WO 2009/109614 and WO 2009/109653 disclose an optical disc comprising a substrate layer, a read-only data layer arranged in tracks on the substrate layer and a non-linear layer with a super-resolution structure disposed on the data layer. An inversed data structure is proposed for the smallest pits and lands corresponding with super-resolution pits and lands having a size below the optical resolution limit of an optical pickup for reading of the data, to overcome a problem that the smallest pits and lands provide an inverted read-out signal when reading the data on the optical disc. This problem has emerged in particular when using a phase change material as the super-resolution structure.

EP-A-814 464 describes an optical disc comprising marks and spaces of different lengths, wherein the shortest marks of a mark train have a width larger than the other marks of the mark train. In another embodiment, pits having different lengths have different widths such, that the width is inversely proportional to the length of the pits as long as the length is equal to or less than the diameter of a reproducing beam spot of a corresponding pickup for reading of the data.

KURIHARA ET AL: "High-Speed Fabrication of Super-Resolution Near-Field Structure Read-Only Memory Master Disc using PtOx Thermal Decomposition Lithography", JAPANESE JOURNAL OF APLLIED PHYSICS, vol. 45, no. 2B, 24 Feb. 2006 (2006-02-24), pages 1379-1382, describes investigations on super-resolution near-field structure read-only discs, on which pits of different shapes are provided, and its effects on the super-resolution near-field structure disc properties where studied. It was found that elliptical pits with a high aspect ratio exhibit enhanced read-out characteristics with regard to round pits, evaluated with regard to the carrier-to-noise ratio.

KIM ET AL: "Random Signal Characteristics of Super Resolution Near Field Structure Read Only Memory Disc", JAPANESE JOURNAL OF APLLIED PHYSICS, vol. 45, no. 2B, 24 Feb. 2006 (2006-02-24), pages 1374-1378, describes super-resolution near-field structure optical discs having pits of different shapes, and noise characteristics have been measured as a function of the pit width. It was found that the readout characteristics of short pits below the optical resolution limit is improved when increasing the pit width.

BRIEF SUMMARY OF THE INVENTION

The optical disc comprises a substrate layer, a read only data layer having a pit/land data structure arranged in tracks on the substrate layer and a nonlinear layer with a super-resolution structure disposed on the substrate layer, wherein the pit/land data structure has an average pit width and a super-resolution pit following a super-resolution land and a preceding diffractive pit is enlarged in width with regard to the average pit width, and a diffractive pit preceding a super-resolution land and a subsequent super-resolution pit is reduced in pit width with regard to the average pit width. In addition, a super-resolution pit following a diffractive land is also advantageously enlarged in width with regard to the average pit width.

The detectability of the super-resolution pits and lands is therefore increased for cases, when a large land or a large pit is preceding a super-resolution pit or a super-resolution land, which may lead to the situation, that the small signal of the super-resolution pit or super-resolution land is embedded in the large signal of a large preceding pit or land.

In addition, the end of a diffractive pit preceding a super-resolution land is provided advantageously as an inclined plane, or at least the end of a diffractive pit preceding a super-resolution land and a subsequent super-resolution pit is provided as an inclined plane.

In a further aspect of the invention, the beginning of a super-resolution pit following a diffractive land is provided as an inclined plane to extend the effective length of the super-resolution pit. Also, it may be advantageous to enlarge all super-resolution pits in width with regard to the average pit width.

In a preferred embodiment, the nonlinear layer comprises a semiconductor material as a super-resolution structure, and the pits are represented as depressions in the data layer.

In another preferred embodiment, the nonlinear layer comprises a phase change material as a super-resolution structure, and the pits are represented as protrusions on the data layer.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
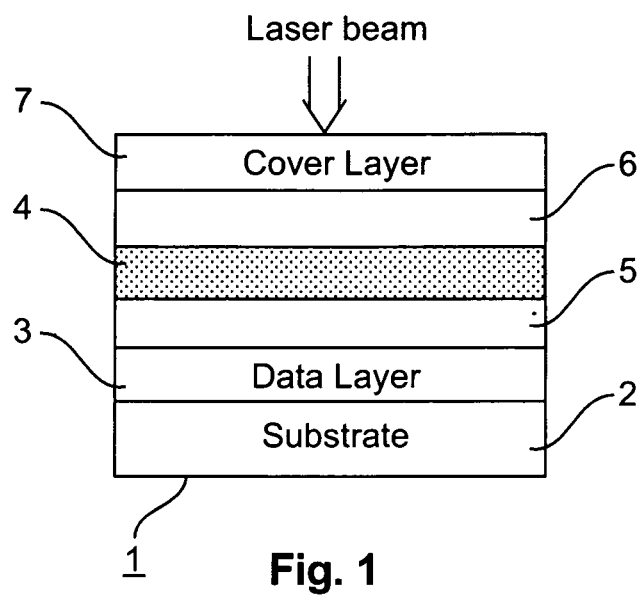
FIG. 1 an optical disc in a sectional view with a layer stack comprising a substrate, a data layer and a nonlinear layer, FIG. 2 a data signal of a data sequence of an InSb super-resolution optical disc rotating in normal rotation direction together with a data signal when the optical disc is rotating in reverse direction, FIG. 3 the data signal of FIG. 2 for the normal rotation direction together with the mirrored data signal obtained when the optical disc is rotating in reverse direction, FIG. 4 diagrams depicting measured relative amplitudes of small and large pits of the optical disc according to FIG. 2, FIG. 5 a diagram for explaining the measurement results shown in FIG. 2, FIG. 6 a track of an optical disc with pits and lands according to a first embodiment of the invention, FIG. 7 a data signal of a data sequence of an AgInSbTe super-resolution optical disc rotating in normal rotation direction together with a data signal when the optical disc is rotating in reverse direction, FIG. 8 the data signal of FIG. 7 for the normal rotation direction together with the mirrored data signal obtained when the optical disc is rotating in reverse direction, FIG. 9 diagrams depicting measured relative amplitudes of small and large pits of the optical disc according to FIG. 7, FIG. 10 a diagram for explaining the measurement results shown in FIG. 7, FIG. 11 a track of an optical disc with pits and lands according to a second embodiment of the invention and FIG. 12 a track of the optical disc of FIG. 6 comprising a sequence of super-resolution pits having different pit widths.

In FIG. 1 an optical storage medium 1 is shown in a cross section in a simplified manner. The optical storage medium 1 is in particular a read-only (ROM) optical storage disc. On a substrate 2 a data layer 3 is arranged which may comprise a reflective metallic layer, for example an aluminum layer. The data layer 3 has a data structure consisting of marks and spaces arranged on essentially parallel tracks. For a ROM disc, the marks and spaces consist of pits and lands, the pits being molded or embossed on the surface of substrate 2 for representing the data layer 3. On the data layer 3 a first dielectric layer 5 is arranged and on the dielectric layer 5 a nonlinear layer 4 is arranged for providing the function of a mask layer for utilizing a super-resolution effect. The nonlinear layer 4 comprises in particular a super-resolution structure for providing the super-resolution effect, e.g. a super-resolution near-field structure (Super-RENS).

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The optical storage medium 1 is in particular an optical disc having outside dimensions similar to DVDs and CDs. The first and second dielectric layers 5, 6 comprise for example the material $ZnS-SiO_2$. The substrate 2 and the cover layer 7 may consist of a plastic material, as known from DVDs and CDs. The layers of the storage medium 1 are arranged particularly as a layer stack. The nonlinear layer 4 comprises for example a semiconductor material of the III-V semiconductor family, e.g. GaSb, InAs or InSb, or a phase-change material, for example a chalcogenide material, as the super-resolution structure.

The super-resolution effect allows detecting pits, which have a size, in particular a length, which is below the optical resolution limit of a corresponding apparatus for reading of the data of the optical storage medium. It has been demonstrated that the super-resolution detection of an optical disc comprising a phase-change material, also other materials like semiconductor materials, is related to a local change of the optical properties of the nonlinear layer 4.

Recent experiments have shown that for some situations the smallest pits and lands, being below a resolution limit of a pickup for reading of the data, cannot be decoded correctly for an optical disc comprising a super-resolution structure, when they follow a large land, respectively a large pit. For example, when a 2T land, which is a land having a length being below the optical resolution limit of the pickup, follows a large pit, e.g. a 5T or 8T pit, the 2T land will not be detected by the pickup. This phenomenon can be seen in FIG. 2, which shows that a super-resolution pit being separated by a super-resolution land from a preceding large diffractive pit cannot be detected. The channel bit length T is for example 40 nm or 50 nm, a 2T pit and 2T land has therefore a length of 80 nm or 100 nm.

The optical resolution limit of a pickup for reading data of the optical storage medium can be defined as lambda/4NA, wherein lambda is the laser wavelength of the pickup and NA the numerical aperture of the pickup. The pits and lands of the optical storage medium having a size below the optical resolution limit are in particular 2T and 3T pits and lands, or 2T pits and lands, depending on the data density of the optical storage medium, wherein T is the channel bit length.

2T and/or 3T pits and lands having a length being below the optical resolution limit of the pickup will be called in this context super-resolution pits and lands, because they can be detected only by using a super-resolution effect. 5T-8T pits and lands have a length being above the resolution limit of the pickup are called in this context diffractive pits and lands, because for the detection a diffractive effect is effective, as known e.g. from Blu-Ray discs.

Graph 21 of FIG. 2 shows detection of a data sequence of alternatingly 10 pits SP1-SP10 and 10 lands SL1-SL10 having a length of each 80 nm, which are preceded by a 400 nm diffractive land DL and followed by a 400 nm diffractive pit DP. Shown is the amplitude A as a function of time t. The laser power is 2.8 mW. The data structure is arranged on an optical disc comprising a nonlinear layer provided by an InSb layer as the super-resolution structure. As can be seen, the first super-resolution pit SP1 following the diffractive land DF is clearly resolved, also the following sequence of super-resolution pits and lands. After the last super-resolution land SL10 follows the diffractive pit DP of length 400 nm, after which follows a diffractive land DL of same size.

But when the disc is rotated in reverse direction for reading the same sequence of super-resolution pits and lands, the situation is different: The sequence of the 10 super-resolution pits and lands begins with a super-resolution land SL1, after a preceding diffractive pit DP. The sequence of the 10 super-resolution pits and lands ends correspondingly with a super-resolution pit SP10 followed by a diffractive land DL. The data signal obtained with the pickup when reading the data in reverse direction, graph 22, is displayed in FIG. 2 in correspondence with the data signal of graph 21. As can be seen, after the last diffractive pit DP of graph 22 the signal amplitude is rising because super-resolution land SL1 is following, but the subsequent super-resolution pit SP1 is not resolved. Only the next super-resolution land SL2 is resolved, also the subsequent super-resolution pits and lands.

This is a surprising effect, because the super-resolution pit SP1 following a large diffractive land DL is clearly resolved as shown by graph 1, but the super-resolution pit SP1 following a large diffractive pit DP is not resolved according to graph 22. Correspondingly, also the super-resolution land SL1 between the diffractive pit DP and super-resolution pit SP1 is not detected. Normal rotation direction for reading of the user data is in particular in this embodiment the disc rotation with a counterclockwise rotation, and the reverse rotation direction is a clockwise rotation.

For a better comparison of graph 22 with graph 21, in FIG. 3 graph 22 is mirrored with regard to the amplitude and displayed together with graph 21, so that the signal of the pits and lands of graph 21 correspond with the signals of graph 22. Graph 22 of FIG. 3 confirms that the first super-resolution pit and first super-resolution land following a large diffractive pit are not detected by the pickup. Super-resolution land SL2 and super-resolution pit SP2 are detected, also the subsequent super-resolution pits SP3-SP10 and super-resolution lands SL3-SL10.

One of the reasons for this effect is, that the data signal obtained by the pickup for the super-resolution pits and lands is very small with regard to the data signals obtained for the diffractive pits and lands. The relative amplitudes of small and large pits have been measured and are displayed in FIG. 4, which shows the resolution R of pits as a function of the pit length L. The resolution is defined in this context as the amplitude of a pit of a given length, divided by the amplitude of a pit having a length of 600 nm. Investigated are pits beginning with a smallest pit length of 100 nm and including pits with stepwise increasing pit length of 50 nm up to the largest pit length of 600 nm. The pits are arranged on a super-resolution optical disc comprising InSb as the super-resolution material of the nonlinear layer.

Figure 4:
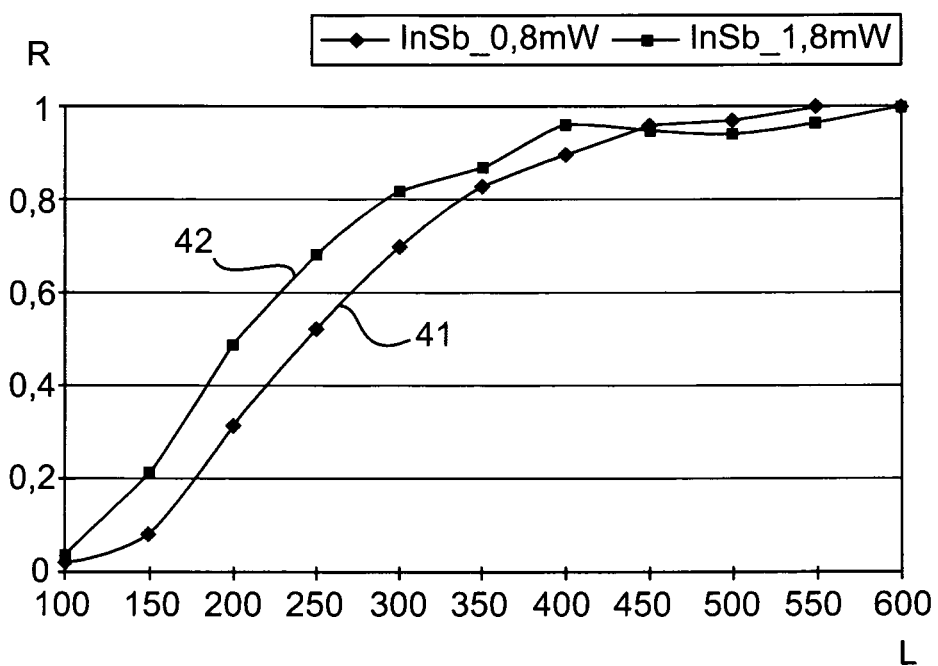

Graph 41 shows the resolution of the pits obtained when using a laser power of 0.8 mW, which is not sufficient for providing a super-resolution effect of the nonlinear layer. Graph 42 shows the resolution of the same pits when using a laser power of 1.8 mW, which is sufficient for providing a super-resolution effect. As can be seen in FIG. 4, the super-resolution effect is not only effective below the pit length of 150 nm, which is about the resolution limit of the pickup, but also for larger pit lengths. Further, for the pit length of 100 nm, the resolution R is very small in comparison with the larger pits, even for the laser power of 1.8 mW, and therefore the amplitude of the data signals obtained for super-resolution pits and lands of 100 nm length or below is correspondingly very small. The pickup used for these measurements, also for the other measurements of FIG. 2 and FIGS. 5-7, is a Blu-Ray type pickup having a laser wavelength of 405 nm and a numerical aperture NA=0.85. The resolution limit of this pickup is due to the diffraction theory correspondingly about 120 nm mark length, mark length being referred here to the length of a land or a pit.

Further, simulations for explaining the super-resolution effect have shown that the super-resolution effect is mainly provided by the super-resolution lands, and that the super-resolution pits provide only a comparatively small signal with regard to the super-resolution lands. This explains why a super-resolution land and a subsequent super-resolution pit following a large diffractive pit are not detected, as shown by graph 22 of FIG. 2.

Figure 5:
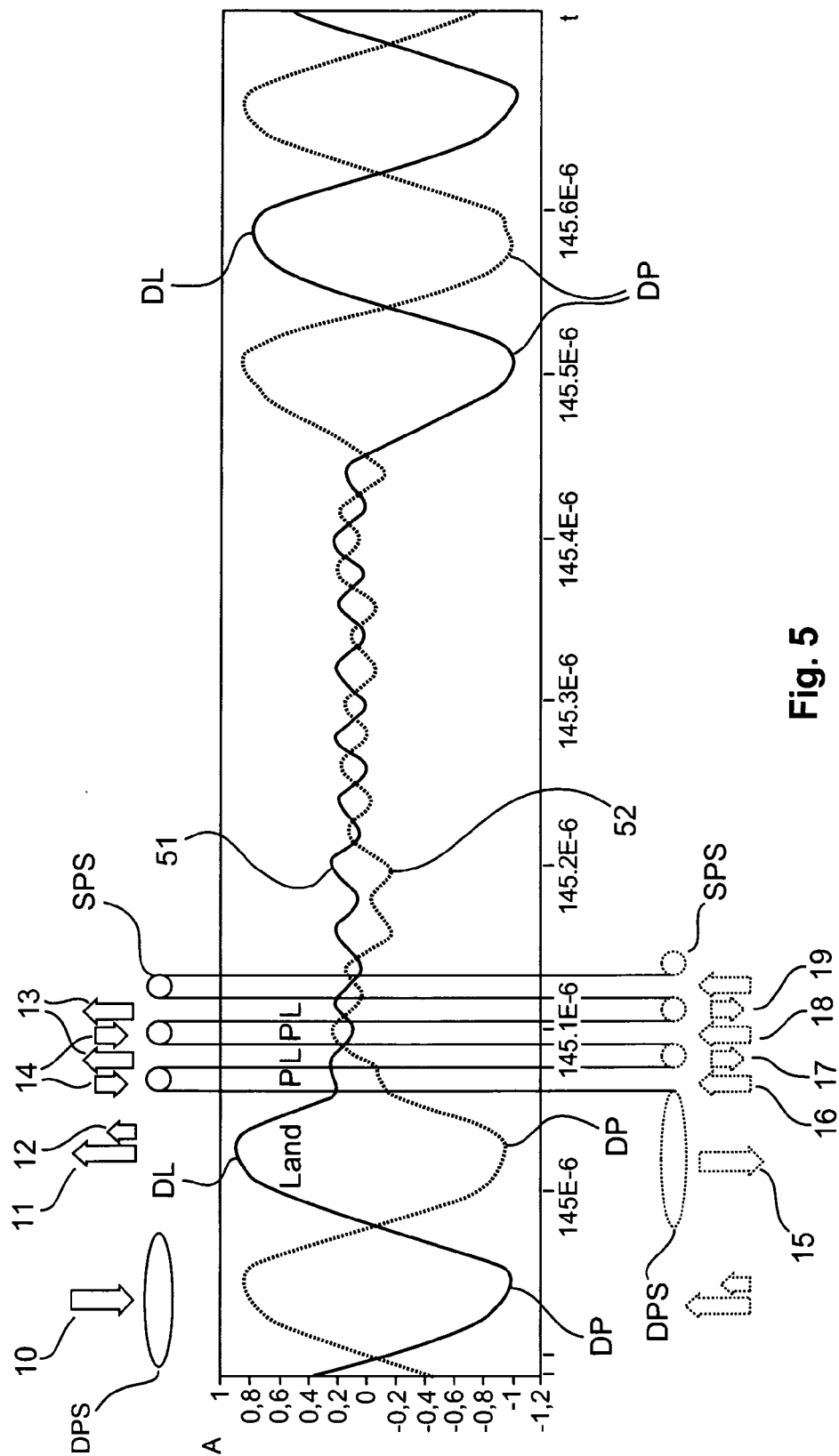

This effect is explained in more detail with regard to FIG. 5. Graph 51 shows a sequence of 10 super-resolution pits and 10 super-resolution lands, arranged between a preceding diffractive land DL and followed by a diffractive pit DP, similar to graph 21 of FIGS. 2 and 3. As a difference, the length of the super-resolution pits and lands is each 100 nm and the length of the diffractive pits and lands is each 400 nm. Graph 52 of FIG. 5 shows the data signal for these pits and lands, but using a reverse rotation of the optical disc. Again, the first super-resolution land and first super-resolution pit following the diffractive pit DP are not resolved during data reading in reverse direction, but only the subsequent super-resolution pits and lands, in agreement with FIG. 2.

Indicated in FIG. 5 is in addition the size DPS of the diffractive pits and the size SPS of the super-resolution pits. Also the corresponding reflectivity for the pits and lands is indicated by arrows, as originating from the diffractive effect and the super-resolution effect. The first diffractive pit DP, graph 51, provides a low reflectivity 10 and the subsequent diffractive land DL a high reflectivity 11. For the diffractive land DL, also reflectivity 12 is shown, provided in addition by the super-resolution effect, in accordance with FIG. 4. The super-resolution lands have also a higher reflectivity 13 and the super-resolution pits have a lower reflectivity 14, but for the super-resolution pits, the reflectivity 14 provides only a much smaller contribution to the data signal in comparison with the data signal of the super-resolution lands. This explains why the first super-resolution land after diffractive land DL is clearly resolved in graph 51 and therefore also the first super-resolution pit after diffractive land DL.

But the situation is different, when the disc is rotated in reverse direction, graph 52: The diffractive pit DP of size DPS provides a reflectivity 15. The first super-resolution land following this diffractive pit DP provides a large reflectivity 16 leading to a rise of the amplitude of the data signal, but the subsequent super-resolution pit provides only a small reflectivity 17 with regard to the reflectivity 16 of the preceding super-resolution land. The amplitude of the data signal is therefore still increasing with the consequence, that the first super-resolution land and correspondingly also the first super-resolution pit of the super-resolution data sequence are not detected by the pickup according to graph 52. Only the subsequent super-resolution land having reflectivity 18 and the subsequent super-resolution pit having reflectivity 19 are detected.

To overcome this problem, the optical disc comprises a read-only data layer with a pit/land data structure comprising pits with an average pit width, in which data structure super-resolution pits following a diffractive land are enlarged in width with regard to the average pit width, and/or super-resolution pits following a super-resolution land and a preceding diffractive pit are enlarged in width with regard to the average pit width, and/or diffractive pits preceding a super-resolution land are reduced in pit width with regard to the average pit width.

Figure 6:
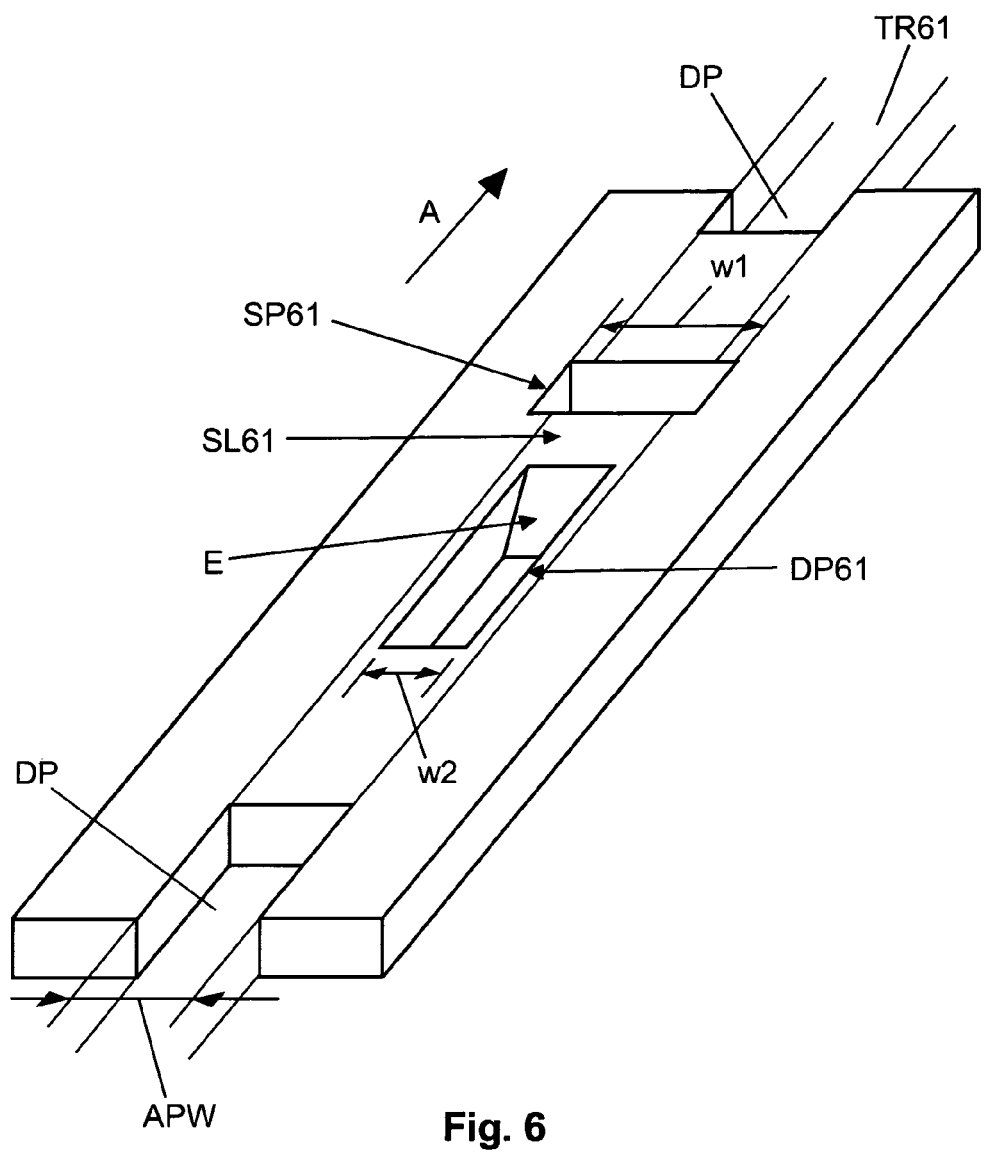

As shown in FIG. 6, an optical disc comprises a track TR61 with a super-resolution pit SP61 following a super-resolution land SL61. The super-resolution land SL61 is preceded by a diffractive land DP61. The width w1 of super-resolution pit SP61 is enlarged with regard to an average pit width APW, which is defined in this embodiment by diffractive pits DP included in track TR61 of the data structure, also in corresponding tracks of the optical disc, not shown in FIG. 6. The optical disc is rotated in the direction indicated by arrow A.

By increasing the width w1 of super-resolution pit SP61, the signal amplitude of super-resolution pit SP61 is increased and correspondingly the detectability of super-resolution pit SP61.

In addition, the width w2 of diffractive pit DP61 preceding super-resolution land SL61 and super-resolution pit SP61 is reduced in this embodiment with regard to the average pit width APW, to reduce the signal amplitude of diffractive pit DP61. The read-out signal of pit DP61 is based on an interference effect between the reflected light from the bottom of pit DP61 and the surrounding area of DP61, due to a phase shift depending on the pit depth. The width w2 can be reduced by a large amount, for example by a factor of two with regard to the average pit width APW, and the amount of reflected light from the bottom of pit DP61 is correspondingly smaller. The readout signal of diffractive pit DP61 is therefore essentially reduced, which increases the readability of super-resolution pit SP61 and super-resolution land SL61.

Further, the end of diffractive pit DP61 is provided advantageously as an inclined plane E, which reduces the signal amplitude of diffractive pit DP61 further, to reduce the influence of diffractive pit DP61 with regard to the small signal amplitudes of the super-resolution land SL61 and super-resolution pit SP61.

As can be seen in FIG. 2, super-resolution pit SP1 of graph 21 following diffractive land DL provides already clearly detectable signal amplitude, but nevertheless, the width of the super-resolution pit SP1 can be enlarged also in width with regard to the average pit width, to improve the signal of super-resolution pit SP1. The reflectivity 14 of super-resolution pit SP1 of graph 52, FIG. 5, is correspondingly lower when enlarging the width of the first super-resolution pit SP1 following the first diffractive land DL.

Advantageously only the first super-resolution pit of a consecutive row of super-resolution pits and land has an enlarged pit width, in particular a first super-resolution pit following a super-resolution land being preceded by a diffractive pit. The super-resolution pits following the first super-resolution pit of this track have a pit width in accordance with the average pit width, because they provide a sufficient read-out signal as can be seen e.g. in FIG. 5. Therefore, only super-resolution pits having a low detectability are enlarged in width. Hence, only a small number of pits have an enlarged width, and crosstalk effects to adjacent tracks can be neglected.

Figure 12:
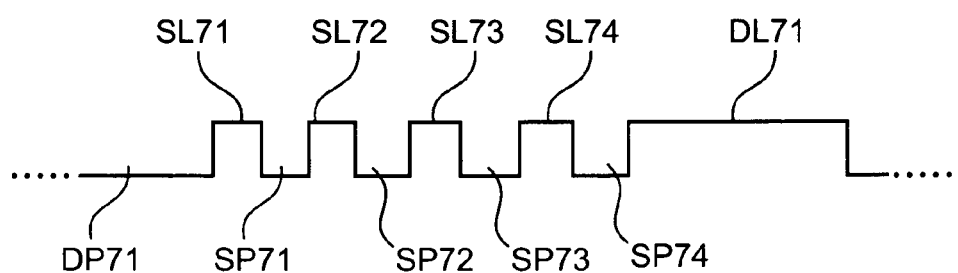

FIG. 12 shows an embodiment of a track of the optical disc of FIG. 6 having a sequence of 2T super-resolution pits and lands, a first super-resolution pit SP71 is following a super-resolution land SL71, which is preceded by diffractive pit DP71. The sequence contains further super-resolution lands SL72-SL74 and super-resolution pits SP72-SP74 following the first super-resolution pit SP71, until a diffractive land DL71 follows super-resolution pit SP74. Accordingly, only super-resolution pit SP71 is extended in pit width, but the super-resolution pits SP72-74 have a pit width in accordance with the average pit width, to avoid any unnecessary crosstalk to adjacent tracks.

In a preferred embodiment, the nonlinear layer of the optical disc comprises a semiconductor material as the super-resolution structure, wherein the pits are represented as depressions on the data layer, in accordance with the optical disc as used for the measurements of FIGS. 2-5. The semiconductor material is for example a compound of the III/V semiconductor family, e.g. InSb, GaSb or InAs. For this kind of optical disc, a data structure is advantageous, wherein the pits are represented as depressions on the data layer, in accordance with FIG. 6.

In another preferred embodiment, the nonlinear layer of the optical disc comprises a phase change material as the super-resolution structure, e.g. a chalcogenide material like GeSbTe or AgInSbTe. Measurements have been made also for optical discs comprising AgInSbTe as the super-resolution structure and having a data structure with super-resolution pits and lands in correspondence with the preceding optical discs. Measurements corresponding with FIGS. 2 and 3 are shown in FIGS. 7 and 8.

FIG. 7 corresponds with FIG. 2 in which graph 61 shows the detection of a data sequence of alternatingly 10 super-resolution pits SP1-SP10 and 10 super-resolution lands SL1-SL10 having a length of each 80 nm, which are preceded by a 400 nm diffractive lands DL and followed by a 400 nm diffractive pit DP. Shown is the amplitude A as a function of time t. The data structure corresponding with the graph 61 is the same as for the data structure of graph 21 of FIG. 2.

When the disc is rotated in reverse direction for reading the same sequence of super-resolution pits and lands, the situation is again different. The data signal obtained with the pickup when reading the data in reverse direction, graph 62, is displayed in FIG. 7 in correspondence with the data signal of graph 61. As can be seen, after the last diffractive pit DP of graph 62 the signal amplitude is rising because super-resolution land SL1 is following, but the subsequent super-resolution pit SP1 is not resolved. Only the next super-resolution land SL2 is resolved, also the subsequent super-resolution pits and lands. Correspondingly, also the super-resolution land SL1 between the diffractive pit DP and super-resolution pit SP1 is not detected. The optical disc comprising AgInSbTe as the super-resolution structure exhibits therefore the same effect as the optical disc comprising InSb as the super-resolution structure. Normal rotation direction for reading of the user data is here again the disc rotation with a counterclockwise rotation, and the reverse rotation direction is a clockwise rotation.

For a better comparison of graph 62 with graph 61, in FIG. 8 graph 62 is mirrored with regard to the amplitude and displayed together with graph 61, so that the signal of the pits and lands of graph 61 correspond with the signals of graph 62. Graph 62 of FIG. 8 confirms that the first super-resolution pit and first super-resolution land following a large diffractive pit are not detected by the pickup. Super-resolution land SL2 and super-resolution pit SP2 are detected, also the subsequent super-resolution pits SP3-SP10 and super-resolution lands SL3-SL10.

Figure 9:
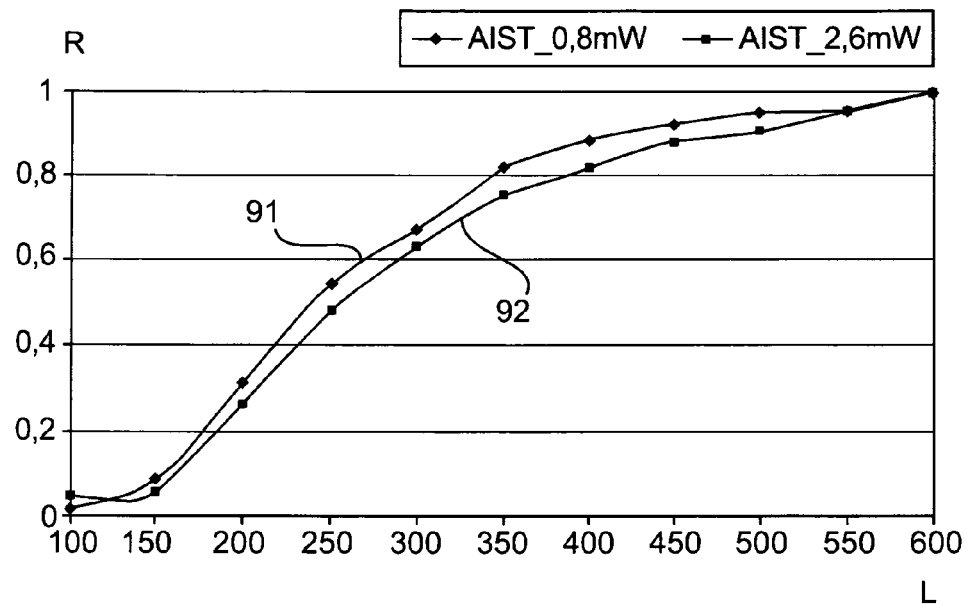

The relative amplitudes of small and large pits have been measured also for the optical disc comprising AgInSbTe as the super-resolution structure and are displayed in FIG. 9. The resolution R of pits is shown as a function of the pit length L. The resolution is defined in correspondence with FIG. 4. Investigated are pits beginning with a smallest pit length of 100 nm and include pits with stepwise increasing pit length of 50 nm up to the largest pit length of 600 nm.

As can be seen in FIG. 9, the resolution R for the higher laser power, graph 92, is only larger than the resolution R of graph 91 for the lower laser power in the region of mark length 100 nm. For mark length 150 nm and larger, graph 91 provides a higher resolution in comparison with graph 92, up to 500 nm, in contrast with the measurements of FIG. 4 for the material InSb. The only explanation for this result is that for the material AgInSbTe, the reflectivity change in the super-resolution regime is contrary to the reflectivity change of the diffractive effect for the diffractive pits, and that the super-resolution effect still provides a contribution to the reflectivity up to a mark length of about 500 nm. Because of the opposite signs of the super-resolution effect and the diffractive effect, the resolution of graph 92 is smaller than the resolution of graph 91 for the range 150-500 nm.

This may explain also, that the signals of the super-resolution pits SP1-SP10 of graph 61 are not as pronounced as the signal of the super-resolution pits SP1-SP10 of graph 21, FIG. 2, and therefore, the detectability of super-resolution pits for a phase change material is reduced.

Figure 10:
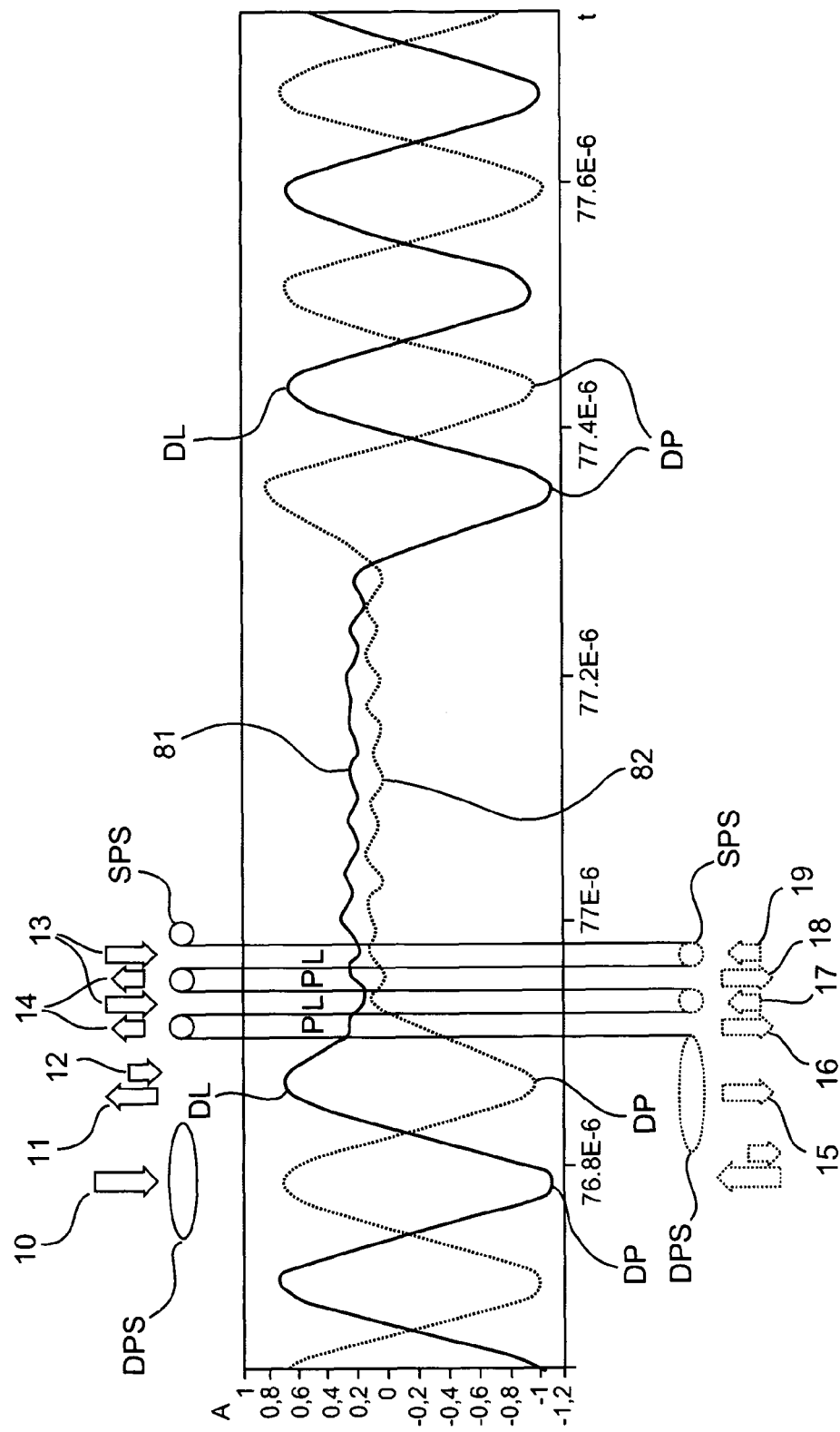

The effect of the not detected first super-resolution land and pit as shown in FIGS. 7 and 8 is explained in more detail with regard to FIG. 10. Graph 81 shows a sequence of 10 super-resolution pits and 10 super-resolution lands, arranged between a preceding diffractive land DL and a diffractive pit DP, corresponding to graph 61 of FIGS. 7 and 8. Graph 82 of FIG. 10 shows the data signal for these pits and lands, but using a reverse rotation of the optical disc, corresponding to graph 62 of FIG. 7. As explained with regard to FIG. 7, the first super-resolution land and first super-resolution pit following the diffractive pit DP are not resolved when reading the data in reverse direction, graph 82, but only the subsequent super-resolution pits and lands.

Schematically indicated in FIG. 10 is in addition the size DPS of the diffractive pits and the size SPS of the super-resolution pits. Also the corresponding reflectivity for the pits and lands is indicated by arrows, as originating from the diffractive effect and the super-resolution effect with regard to FIG. 9. The first diffractive pit DP, graph 81, provides a low reflectivity 10 and the subsequent diffractive land DL a high reflectivity 11. For the diffractive land DL, also reflectivity 12 is shown, provided in addition by the super-resolution effect, which is of opposite sign in accordance with FIG. 9. The super-resolution lands have a lower reflectivity 13 and the super-resolution pits have a higher reflectivity 14. For the super-resolution pits, the reflectivity 14 provides only a much smaller contribution to the data signal in comparison with the reflectivity 13 of the super-resolution lands. This explains why the first super-resolution land after diffractive land DL is clearly resolved in graph 81. Also the first super-resolution pit after diffractive land DL is just resolved.

But the situation is different, when the disc is rotated in reverse direction, graph 82: The diffractive pit DP of size DPS provides a low reflectivity 15. The first super-resolution land following this diffractive pit DP provides a low reflectivity 16 according to FIG. 9. The subsequent super-resolution pit provides a comparatively small high reflectivity 17 with regard to the reflectivity 16 of the preceding super-resolution land leading to a rise of the amplitude of the data signal. As a consequence, the first super-resolution land cannot be resolved by the pickup according to graph 82. Only the subsequent super-resolution land having low reflectivity 18 and the subsequent super-resolution pit having high reflectivity 19 are detected.

Figure 11:
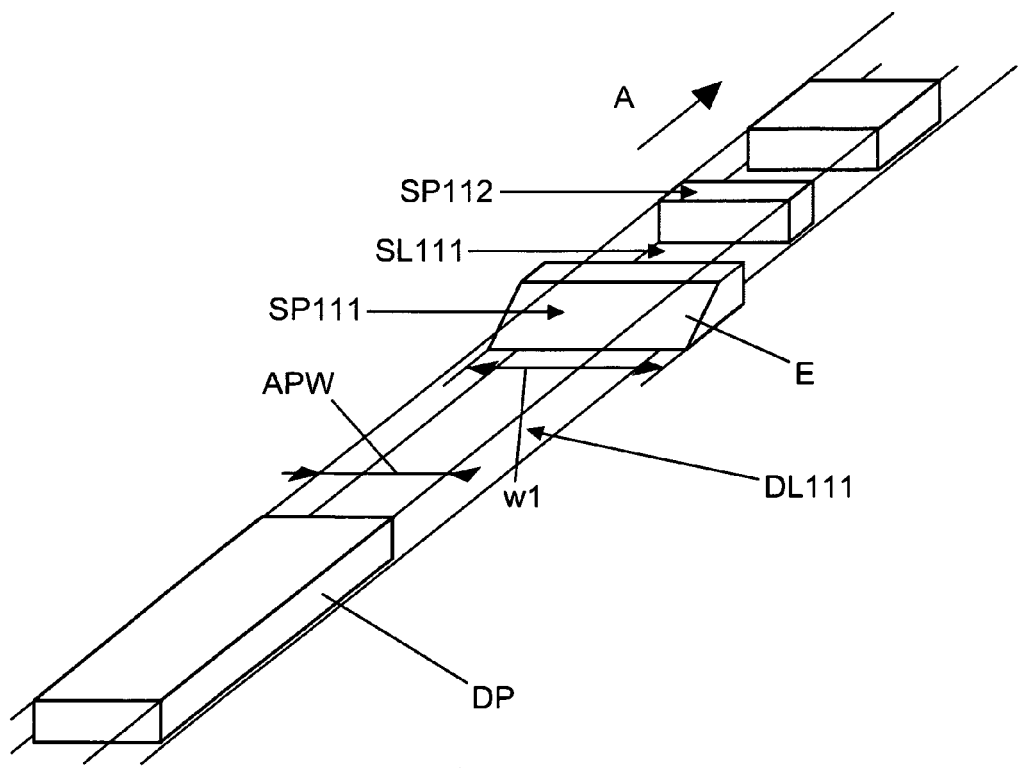

The detectability of super-resolution pits of an optical disc comprising a phase change material as the nonlinear layer can be improved when using an inverted data structure, wherein the pits are represented as protrusions or bumps of a data layer, as shown in FIG. 11. For pits and lands having a size above the optical resolution limit, the data signal is independent on the data structure, whether the data structure has a non-inverted pit/land data structure with pits represented as depressions or holes in the data layer, or whether it has an inverted pit/land data structure with pits represented as protrusions on the data layer. But for the pits and lands having a size below the optical resolution limit, the data signal is inverted for an inverted pit/land data structure, with regard to the non-inverted pit/land data structure. The data signal for the super-resolution pits depends on the pit/land data structure, because the super resolution effect is located on the first encountered surface of the data layer. Therefore, the super-resolution pits provide a low signal and the super-resolution lands a high signal in case of an inverted pit/land data structure.

To improve the detectability of super-resolution pits further, the width w1 of super-resolution pit SL111 following a diffractive land DL111 is enlarged with regard to an average pit width APM, which is defined in this embodiment by diffractive pits DP included in track TR61 of the data structure. In addition, the beginning of super-resolution pit SP111 is provided advantageously as an inclined plane E, to extend the effective length of the super-resolution pit SP111 and to increase correspondingly the amplitude signal.

For the case, that the super-resolution pit SP111 follows a super-resolution land and a preceding diffractive pit, not shown in FIG. 11, but which situation corresponds with the arrangement shown in FIG. 6, the diffractive pit is reduced in pit width with regard to the average pit width APW also for the optical disc comprising a phase change material as the nonlinear layer. In addition the end of a diffractive pit preceding a super-resolution land is provided advantageously as an inclined plane, not shown in FIG. 11, but similar to the diffractive pit DP61 of FIG. 6.

Also other embodiments of the invention can be utilized by a person skilled in the art without departing from the spirit and scope of the present invention. The invention is in particular not limited to the materials as described with regard to the preceding embodiments. The invention resides therefore in the claims herein after appended.

The invention claimed is:
1. Optical disc comprising
a substrate layer,
a read-only data layer having a pit/land data structure with pits having a defined pit width, arranged in tracks on the substrate layer, and
a nonlinear layer with a super-resolution structure disposed on the data layer, wherein super-resolution pits and super-resolution lands have a size below the optical resolution limit and diffractive pits and diffractive lands have a size above the optical resolution limit, a super-resolution pit following a super-resolution land and a preceding diffractive pit is enlarged in width with regard to the defined pit width, a diffractive pit preceding a super-resolution land and a subsequent super-resolution pit is reduced in pit width with regard to the defined pit width, and a super-resolution pit following a diffractive land is enlarged in width with regard to the defined pit width.

2. Optical disc according to claim 1, wherein the end of a diffractive pit preceding a super-resolution land is provided as an inclined plane.

3. Optical disc according to claim 2, wherein the end of a diffractive pit preceding a super-resolution land and a subsequent super-resolution pit is provided as an inclined plane.

4. Optical disc according to claim 2, wherein the beginning of a super-resolution pit following a diffractive land is provided as an inclined plane for extending the effective length of the super-resolution pit.

5. Optical disc according to claim 1, wherein all super-resolution pits are enlarged in width with regard to the defined pit width.

6. Optical disc according to claim 1, wherein the nonlinear layer comprises a semiconductor material as the super-resolution structure, and wherein the pits are represented as depressions on the data layer.

7. Optical disc according to claim 1, wherein the nonlinear layer comprises a phase-change material as the super-resolution structure, and wherein the pits are represented as protrusions on the data layer.

8. Optical disc according to claim 1, comprising a cover layer above the nonlinear layer, a first dielectric layer arranged between the nonlinear layer and the data layer and a second dielectric layer arranged between the nonlinear layer and the cover layer.

9. Optical disc according to claim 1, wherein the optical resolution limit of a pickup for reading data of the optical storage medium is defined as lambda/4NA, lambda being the laser wavelength and NA the numerical aperture of the pickup.

10. Optical disc according to claim 1, wherein a super-resolution pit following a super-resolution land and a preceding super-resolution pit has a pit width in accordance with the defined pit width.

11. Optical disc according to claim 1, wherein all consecutive super-resolution pits after a broadened super-resolution pit and before the next diffractive land or diffractive pit have a pit width in accordance with the defined pit width.

* * * * *